United States Patent [19]

Rosenquist

[11] Patent Number: 4,621,130

[45] Date of Patent: Nov. 4, 1986

[54] COPOLYESTER-CARBONATE RESINS WITH IMPROVED MOLD RELEASE PROPERTIES

[75] Inventor: Niles R. Rosenquist, Evansville, Ind.

[73] Assignee: General Electric Company, Mt. Vernon, Ind.

[21] Appl. No.: 776,423

[22] Filed: Sep. 16, 1985

[51] Int. Cl.$^4$ ............................................. C08G 63/62
[52] U.S. Cl. .................................. 528/176; 528/193; 528/194; 528/196
[58] Field of Search ................ 528/176, 196, 193, 194

[56] References Cited

U.S. PATENT DOCUMENTS 4,550,155  10/1985  Jones et al. ........................ 528/176
4,554,330  11/1985  Mark et al. ......................... 525/462

*Primary Examiner*—Lucille M. Phynes
*Attorney, Agent, or Firm*—Joseph T. Eisele; Martin B. Barancik

[57] ABSTRACT

Thermoplastic copolyester-carbonate resins are described, having included in their polymer chains, moieties of the formula:

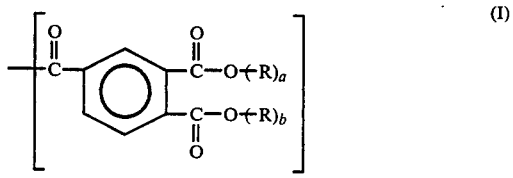

(I)

wherein R represents alkyl of from about 10 to 36 carbon atoms, inclusive, a and b are each whole number integers of from 0 to 1; and the sum of a+b is 1.

The resins are useful as molding compositions and as mold release additives for polycarbonate and copolyester-carbonate molding compositions.

10 Claims, No Drawings

COPOLYESTER-CARBONATE RESINS WITH IMPROVED MOLD RELEASE PROPERTIES

BACKGROUND OF THE INVENTION

The invention relates to thermoplastic polycarbonate resins and more particularly relates to thermoplastic copolyester-carbonate resins having inherent mold release properties.

BRIEF DESCRIPTION OF THE PRIOR ART

Polycarbonate resins have found a wide usage as thermoplastic molding materials to fabricate a wide variety of articles such as automotive component parts, medical devices, housings for tools and the like. When injection molded, they have not met with complete satisfaction, having a tendency to resist demolding. To overcome this tendency, mold release additives have been blended into the molding resins with good success; see for example U.S. Pat. No. 4,444,935. However, in some instances the presence of a conventional mold release additive is undesirable. Over a period of time the additive may migrate to the surface of the molded article, where it "plates out" or if the additive is volatile it may vaporize out of the molded article and condense on nearby surfaces. The resins of the present invention obviate the need for separate additive mold release agents and inherently possess valuable mold release properties. They are also inherently compatible with polycarbonate resins.

A wide variety of copolyester-carbonate thermoplastic resins are known in the prior art as is the method of their preparation; see for example U.S. Pat. No. 4,487,896.

SUMMARY OF THE INVENTION

The invention comprises a copolyester-carbonate resin, containing in the polymer chain at least one divalent moiety of the formula:

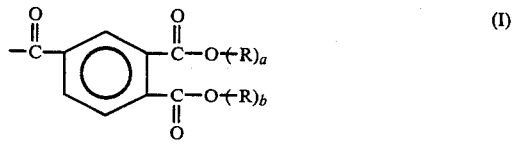

wherein R represents an alkyl of from about 10 to 36 carbon atoms, inclusive, a and b are each whole number integers of from 0 to 1; and the sum of a+b is 1.

The copolyester-carbonates of the invention are useful as thermoplastic molding compositions and as mold release additives when incorporated into thermoplastic polycarbonate resin molding compositions. The moldable resins and resin compositions are useful to mold a wide variety of useful articles such as component parts of automobiles, tool housings and like articles.

The invention also comprises thermoplastic polycarbonate and copolyester-carbonate molding compositions containing as a mold release additive, the copolyester-carbonate resins of the invention, described above and having moieties of the formula (I) appearing in the polymer chain thereof.

The term "alkyl" as used herein means the monovalent moiety obtained upon removal of one hydrogen atom from a parent aliphatic hydrocarbon. Representative of alkyl is decyl, undecyl, dodecyl, tridecyl, tetradecyl, pentadecyl, hexadecyl, heptadecyl, octadecyl, nonodecyl, eicosyl, heneicosyl, docosyl, hexacosyl, heptacosyl, octacosyl, nonacosyl, triacontyl, hentriacontyl, dotriacontyl, tritriacontyl, pentatriacontyl, and isomeric forms thereof.

DETAILED DESCRIPTION OF THE PREFERRED EMBODIMENTS OF THE INVENTION

The copolyester-carbonate resins of the invention may be prepared by the reaction of a carbonate precursor, a dihydric phenol, and a dicarboxylic acid or mixture of dicarboxylic acids selected from those of the formulae:

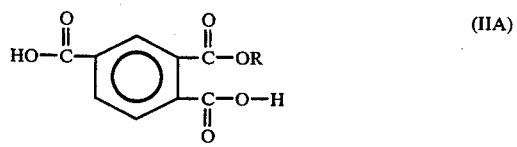

and

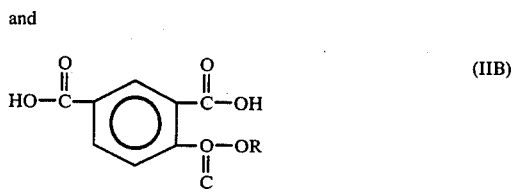

wherein R, is as defined above. The reaction is carried out under conditions to produce a copolyester-carbonate resin. Such reaction conditions are well known to those skilled in the art of polycarbonate polymer resins and are described, for example, in the U.S. Pat. Nos. 3,028,365; 3,334,154; 3,275,601; 3,915,926; 3,030,331; 3,169,121; 3,027,814; and 4,188,314. In general, the preparation may be carried out by interfacial polymerization or phase boundary separation, transesterification, solution polymerization, melt polymerization, interesterification, and like processes. Interfacial polymerization is preferred.

Although the processes may vary, several of the preferred processes typically involve dissolving or dispersing the reactants in a suitable water immiscible solvent medium and contacting the reactants with a carbonate precursor, such as phosgene, in the presence of a suitable catalyst and an aqueous caustic solution under controlled pH conditions. A molecular weight regulator, that is a chain stopper, is generally added to the reactants prior to or during contacting them with a carbonate precursor. Useful molecular weight regulators include, but are not limited to, monohydric phenols such as phenol, chroman-I, paratertiarybutylphenol, and the like. Techniques for the control of molecular weight are well known in the art and may be used in the present process for controlling the molecular weight of the copolyester-carbonate resins. The most commonly used water immiscible solvents include methylene chloride, 1,2-dichloroethane, chlorobenzene, toluene, and the like.

The catalysts which can be employed, if an interfacial polymerization technique is used, accelerate the rate of polymerization of the dihydric phenol reactant with the ester precursor such as the dicarboxylic acid and with the carbonate precursor such as phosgene. Suitable catalysts include but are not limited to tertiary amines such as triethylamine, quaternary phosphonium compounds, quaternary ammonium compounds, and the like.

The preferred process comprises a phosgenation reaction. The temperature at which the phosgenation reaction proceeds may vary from below 0° C., to above 100° C. The reaction preferably proceeds at temperatures of from room temperatures (25° C.) to 50° C. Since the reaction is exothermic, the rate of phosgene addition may be used to control the reaction temperature. The amount of the phosgene required will generally depend upon the amount of the dihydric phenol present. Generally speaking, one mole of phosgene will react with one mole of the dihydric phenol to provide the polymer and two moles of HCl. Two moles of HCl are in turn "attached" by an acid acceptor, preferably present. The foregoing are herein referred to as stoichiometric or theoretical amounts.

A suitable acid acceptor present in the reaction mixture may be either organic or inorganic in nature. Representative of an organic acid acceptor is a tertiary amine such as pyridine, triethylamine, dimethylaniline, tributylamine, etc. An inorganic acid acceptor may be one which can be either a hydroxide, a carbonate, a bicarbonate, or a phosphate or an alkali or alkaline earth metal hydroxide.

Dihydric phenol reactants employed in the method of the invention to prepare the copolyester-polycarbonate resins of the invention are generally well known compounds as are methods of their preparation. Representative of such dihydric phenols are phenolic diols of the general formula:

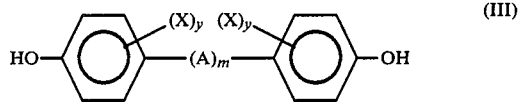

wherein A is selected from the group consisting a divalent hydrocarbon containing from 1 to about 15 carbon atoms; a substituted divalent hydrocarbon radical containing from 1 to about 15 carbon atoms and substituent groups such as halogen;

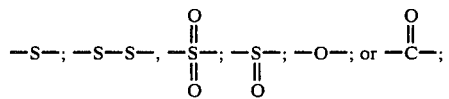

and wherein each X is independently selected from the group consisting of halogen, a monovalent hydrocarbon radical such as an alkyl group of from 1 to about 8 carbon atoms, an aryl group of from 6–18 carbon atoms, an aralkyl group of from 7 to about 14 carbon atoms, an oxyalkyl group of from 1 to about 8 carbon atoms, and an oxyaryl group of from 6 to 18 carbon atoms; and wherein m is zero or 1 and y is a whole number integer of from 0 to 4.

Typical of some of the dihydric phenols that can be advantageously employed in the practice of the present invention are bis-phenols such as bis(4-hydroxyphenyl)methane, 2,2-bis(4-hydroxyphenyl)propane (also known as bisphenol A), 2,2-bis(4-hydroxy-3-methylphenyl)propane, 4,4-bis(4-hydroxyphenyl)heptane, 2,2-bis(4-hydroxy-3,5-dichlorophenyl)propane, 2,2-bis(4-hydroxy-3,5-dibromophenyl)propane, etc.; dihydric phenol ethers such as bis(4-hydroxyphenyl)ether, bis(3,5-dichloro-4-hydroxyphenyl)ether, etc.; dihydroxydiphenyls such as p,p'-dihydroxydiphenyl, 3,3-dichloro-4,4'-dihydroxydiphenyl, etc.; dihydroxyaryl sulfones such as bis(4-hydroxyphenyl) sulfone, bis(3,5-dimethyl-4-hydroxyphenyl)sulfone, etc.; dihydroxy benzenes, resorcinol, hydroquinone, halo- and alkyl-substituted dihydroxy benzenes such as 1,4-dihydroxy-2,5-dichlorobenzene, 1,4-dihydroxy-3-methylbenzene, etc.; and dihydroxy diphenyl sulfides and sulfoxides such as bis(4-hydroxyphenyl)sulfide and bis(4-hydroxyphenyl)sulfoxide, bis(3,5-dibromo-4-hydroxyphenyl)sulfoxide, etc. A variety of additional dihydric phenols are also available and are disclosed in U.S. Pat. Nos. 2,999,835; 3,028,365 and 3,153,008, all of which are incorporated herein by reference. It is, of course, possible to employ two or more different dihydric phenols or a combination of a dihydric phenol with glycol.

Preferred dihydric phenols of Formula (III) are the 4,4'-bisphenols.

The carbonate precursor employed in the present invention may be a carbonyl halide, a diarylcarbonate, or a bishaloformate. The carbonyl halides include carbonyl bromide, carbonyl chloride, and mixtures thereof. The bishaloformates include the bishaloformates of dihydric phenols such as bischloroformates of dihydric phenols such as bischloroformates of 2,2-bis(4-hydroxyphenyl)propane, hydroquinone, and the like; or the bischloroformates of glycols such as the bischloroformates of ethylene glycol, neopentyl glycol, polyethylene glycol, and the like. Typical of the diarylcarbonates which may be employed are diphenyl carbonate, and the di(alkylphenyl)-carbonates such as di(tolyl) carbonate. Some other non-limiting illustrative examples of suitable diarylcarbonates include di(napthyl)carbonate, phenyl tolyl carbonate, and the like.

The preferred carbonate precursors are the carbonyl halides, with carbonyl chloride, also known as phosgene, being the preferred carbonyl halide.

Dicarboxylic acids of the formula (II) given above may be prepared by the reaction of trimellitic anhydride (IV) with an aliphatic alcohol (V) according to the schematic formulae:

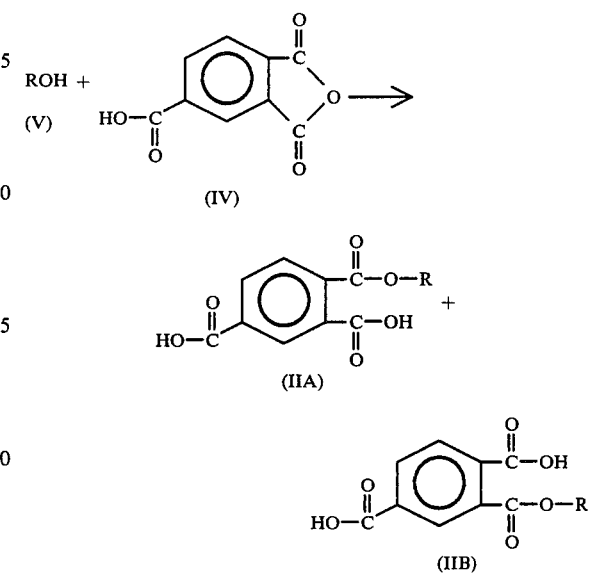

wherein R has the meaning previously ascribed to it.

The above-illustrated reaction for preparation of the isomers of formulae (IIA) and (IIB) may be carried out by mixing stoichiometric proportions of the reactants (IV) and (V) and heating the mixture, preferably to a temperature of circa 100° C. to 200° C. either neat or in the presence of an inert organic solvent. The term "inert organic solvent" as used herein means an organic solvent for the product which does not enter into reaction with the reactants (IV) or (V) or adversely affect the desired course of the reaction. Representative of inert organic solvents are methyl ethyl ketone, methyl isobutyl ketone and the like. The general procedure for the preparation of the Compounds (II) may be found, for example, in U.S. Pat. No. 3,578,638.

Aliphatic alcohols of the formula (V) given above are well known compounds as are methods of their preparation. Representative of aliphatic alcohols of the formula (V) are n-decanol, undecanol, dodecanol, n-tridecanol, tetradecanol, pentadecanol, hexadecanol, heptadecanol, octadecanol, nonadecanol, eicosanol, henecosanol, decosanol, tricosanol, tetracosanol, pentacosanol, hexacosanol, triacontanol, hentriacontanol, dotriacontanol, tetraatriacontanol, pentatriacontanol and hexatriacontanol.

In addition to the dicarboxylic acids of formula (II) given above, the polyester-carbonate resins of the invention may optionally contain reaction residues of other difunctional carboxylic acids, conventionally used in the preparation of copolyester-polycarbonate resins. In general, any difunctional carboxylic acid conventionally used in the preparation of linear polyesters may optionally be utilized in the preparation of the the copolyester-carbonate resins of the instant invention. Generally, the carboxylic acids which may be optionally utilized include the aliphatic carboxylic acids, the aromatic carboxylic acids, and the aliphatic-aromatic carboxylic acids. These acids are well known and are disclosed in U.S. Pat. No. 3,169,121, which is hereby incorporated herein by reference. Representative of such difunctional carboxylic acids are difunctional carboxylic acids of the formula:

$$R^4-(R^5)_q COOH \qquad (VI)$$

wherein $R^5$ is an alkylene, alkylidene, or cycloaliphatic group; an alkylene, alkylidene or cycloaliphatic group containing ethylenic unsaturation; an aromatic group such as phenylene, biphenylene, and the like; two or more aromatic groups connected through non-aromatic linkages such as alkylene or alkylidene groups; and a divalent aralkyl radical such as tolylene, xylylene, and the like. $R^4$ is either a carboxyl or a hydroxyl group. The letter q represents one where $R^4$ is a hydroxyl group and either zero or one where $R^4$ is a carboxyl group.

Preferred difunctional carboxylic acids optionally employed are the aromatic dicarboxylic acids. Particularly useful aromatic dicarboxylic acids are those represented by the general formula:

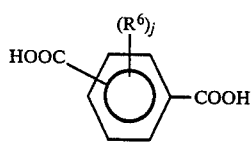

(VII)

wherein j is a positive whole integer having a value of from 0 to 4 inclusive; and $R^6$ is independently selected from the group consisting of alkyl radicals, preferably lower alkyl radicals containing from 1 to about 5 carbon atoms.

Mixtures of these optional difunctional carboxylic acids may be employed as well as single acids. Therefore, where the term difunctional carboxylic acid is used herein it is to be understood that this term includes mixtures of two or more different difunctional carboxylic acids as well as individual carboxylic acids.

Preferred optional aromatic dicarboxylic acids are isophthalic acid, terephthalic acid, and mixtures thereof. A particularly useful carboxylic acid comprises a mixture of isophthalic acid and terephthalic acid wherein the weight ratio of terephthalic acid to isophthalic acid is in the range of from about 1:10 to about 0.2:9.8.

Rather than utilizing the optional difunctional carboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example, instead of using isophthalic acid, terephthalic acid, or mixtures thereof, it is possible to employ isophthaloyl dichloride, terephthaloyl dichloride, and mixtures thereof.

Also included within the scope of the instant invention are randomly branched copolyester-carbonate resins wherein a minor amount (typically between 0.05 and 2 mole percent, based on the quantity of dihydric phenol used) of a polyfunctional aromatic compound is a co-reactant with the dihydric phenol in the reaction mixture, comprising also the carbonate precursor and the ester precursor, to provide a thermoplastic randomly branched copolyester-carbonate. These polyfunctional aromatic compounds contain at least three functional groups which may be hydroxyl, carboxyl, carboxylic anhydride, haloformyl, or mixtures thereof. Some illustrative non-limiting examples of these polyfunctional compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic acid anhydride, and the like. Other organic polyfunctional compounds useful in making these randomly branched copolyester-carbonates are disclosed in U.S. Pat. Nos. 3,635,895 and 4,001,184, both of which are incorporated herein by reference.

The thermoplastic molding resin compositions of the instant invention may also optionally contain various commonly known and used additives such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; color stabilizers such as the organophosphites; thermal stabilizers such as a phosphite; flame retardants; and mold release agents.

Some particularly useful flame retardants are the alkali and alkaline earth metal salts of sulfonic acids. These types of flame retardants are disclosed in U.S. Pat. Nos. 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated herein by reference.

The proportions of reactants employed to prepare the copolyester-carbonate resins of the invention will vary in accordance with the proposed use of the product resin. When the product resin containing the divalent moieties of the formula (I) given above is to be used itself as a thermoplastic molding resin, the dihydric phenol and carbonate precursor are employed in substantially equivalent molar proportions. The dicarboxylic acid(s) of formula (II) is employed in a sufficient molar percent so as to provide a resin with OR groups which comprise from 0.001 to 1.0 weight percent of the weight of the total resin, preferably circa 0.2–0.5 percent, most preferably about 0.3 percent.

When the product resin of the invention is to be used as a mold release additive in other polycarbonate or copolyester-carbonate resin compositions, the dicarboxylic acid of formula (II) may be employed in a sufficient molar percent so as to provide a resin of the invention containing pendant OR groups which comprise from about 1.0 to 10 percent of the weight of the total resin, preferably circa 3 to 5 percent. To employ these latter resins as mold release additives, they may be added to known polycarbonate or copolyester-carbonate resins or blends thereof in the same manner as any conventional additive. For example, added in the dry state and co-extruded in a homogeneous blend or in a solvent and melt extruded with the base resin. The additive copolyester-carbonate resin of the invention is added in an amount effective for mold release of the base resin. Generally, this is in such a proportion that the resulting blend will contain the OR group, as described in the formula (I), in a proportion of from 0.001 to 1.0 weight percent (preferably 0.3 weight percent) of the total resin blend for thermoplastic processing.

As will be appreciated from the above description, the copolyester-carbonate resins of the invention containing divalent moieties of the formula (I) given above will comprise recurring carbonate moieties of the formula:

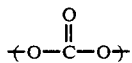

(VIII)

and carboxylate groups of the formula:

(IX)

When the optional difunctional carboxylic acids such as those of the formula (VI) given above are not employed in the preparation of the resins of the invention, the preferred polymer resins of the invention will contain recurring chain units of the formula:

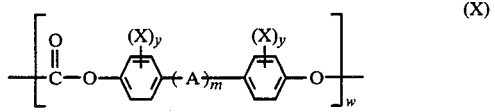

(X)

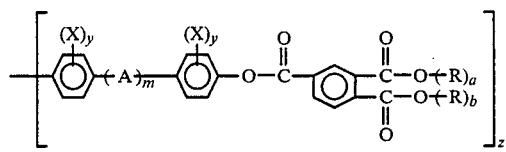

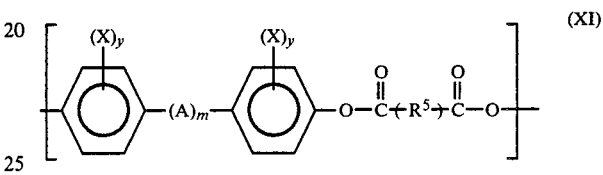

(XI)

wherein A, X, R, m, y, a and b are as defined above; z is an integer such that the ester moiety; —OR comprises 0.001 to 10 weight percent of the resin of the invention; and w is an integer such that w and z together are such that resins of the instant invention generally have a weight average molecular weight in the range of from about 5,000 to about 200,000 preferably in the range of from about 10,000 to about 100,000, and more preferably in the range of from about 20,000 to about 60,000.

When the optional difunctional carboxylic acids such as those of the formula (VI) given above are employed in this invention, the resins of the invention will also preferably contain in the polymer chain, ester moieties, such as those of the formula:

wherein $R^5$, A, X, m and y are as previously defined.

These copolyester-carbonate polymers contain, as stated above, ester and carbonate bonds in the polymer chain. The amount of the ester bonds is from about 5 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds as shown in the formula XI shown above.

The following examples and preparations describe the manner and process of making and using the invention and set forth the best mode contemplated by the inventor of carrying out the invention but are not to be construed as limiting the invention. Where reported, the following tests were carried out.

Mold Release Pressure

The mold-release pressures obtained with the various resins were obtained on an injection molding machine with a 118 cc shot capacity. The mold is a 7.62 cm × 7.62 cm box with a 3.8 cm wall height. It has ejector pins at four corners with two of the pins being attached to strain gauge transducers for measuring the part ejection pressure. The mold is designed with very little draft so that the part would tend to stick to the core.

The moldings are injected at a melt temperature of 305° C. with a cycle time of 40 seconds between injections. The stationary side of the mold is maintained at a temperature of 90.5° C. and the movable side of the mold is maintained at a temperature of 25° C.

The pressures reported are an average of a number of mold ejections. The number of ejections averaged is also reported.

Glass Transition Temperature

The glass transition temperatures were determined by using a Perkin-Elmer DSC-2B instrument which measures the second order glass transition temperature or Tg by differential scanning calorimetry.

Intrinsic Viscosity

The intrinsic viscosity was measured at a temperature of 25° C. in methylene chloride and is reported in deciliters/gram (dl/g).

Preparation 1

To a suitable reaction vessel there is charged equimolar proportions of trimellitic anhydride and octadecanol in methyl isobutyl ketone. The charge is heated to reflux temperature (circa 150° C.) for about one hour. At the end of this time period an aliquot of the reaction mixture shows an absence of anhydride (by infra-red analysis). The solvent is removed under vacuum to obtain a residue which is the mono-octadecyl ester of 1,2,4-benzene tricarboxylic acid.

Preparation 2

The procedure of Preparation 1, supra., is repeated except that the octadecanol as used therein is replaced with an equal proportion of docosanol to obtain the mono-docosanyl ester of 1,2,4-benzene tricarboxylic acid.

EXAMPLE 1

This example is not an example of the invention but is made for comparative purposes.

A reactor vessel fitted with a mechanical agitator is charged with 8.2 L of deionized water, 10.5 L of methylene chloride, 3420 g (15 moles) of bisphenol-A, 21 ml of triethylamine, 5.1 g of sodium gluconate, 52.2 g (0.55 moles) of phenol. Phosgene is introduced into the charge while the charge is agitated. Phosgene is added at a rate of 36 g/minute for 47.5 minutes while the pH of the resulting reaction mixture is maintained between 6 and 8 for the first 7.5 minutes and between 10 and 11 for the remaining 40 minutes. The pH adjustment is made by the addition of 25% aqueous sodium hydroxide. After phosgenation has been terminated, 10 liters of methylene chloride is added, the brine layer is separated by centrifuge and the resin solution is washed with aqueous acid and water. The resin is then steam precipitated and dried. To this resin product is added about 0.03 part by weight per hundred parts by weight of resin of a phosphite color stabilizer. The resin product is then fed to an extruder operating at a temperature of about 510° F. to extrude the resin into strands and the extruded strands are chopped into pellets. Portions of the pellets are injection molded from a conventional molding machine into the box mold described above. Ejection of the molding from the mold box was attempted. The part did not eject and was broken by the pins.

Representative portions of the pellets are also subjected to analysis to determine the intrinsic viscosity (IV) and the glass transition temperature (Tg) of the resin. The analytical results are also set forth in the following Table.

EXAMPLE 2

The procedure of Example 1, supra., is repeated except that there is also included in the reaction vessel charge 20.8 g (0.045 moles) of the octadecyl monoester of 1,2,4-benzene tricarboxylic acid prepared in accordance with the procedure of Preparation 1, supra. Also, the pH of the reaction mixture is maintained at a pH of from 6 to 8 for the first 7.5 minutes after phosgenation is initiated and then at the pH of from 10 to 11 for the remainder of the reaction period. The resin obtained has O $(CH_2)_{17}CH_3$ groups comprising 0.3 weight percent of the total resin weight. The resin analytical results and demolding ejector pin pressure data is shown in the Table, below.

EXAMPLE 3

The procedure of Example 2, supra., is repeated except that the octadecyl ester as used therein is replaced with 19.4 g (0.0375 moles) of the docosanyl monoester of 1,2,4-benzene tricarboxylic acid, prepared in accordance with the procedure of Preparation 2, supra. The resin pellets obtained are of a polycarbonate resin wherein O $(CH_2)_{21}CH_3$ comprises 0.3 weight percent of the total resin weight. The resin analytical results and demolding ejector pin pressure data is shown in the Table, below.

EXAMPLE 4

To a reactor fitted with a mechanical agitator are charged 5.5 liters of deionized water, 7.0 liters of methylene chloride, 2,280 g (10 moles) of bisphenol A, 14 milliliters of triethylamine, 3.4 g of sodium gluconate, 34.8 g (0.37 mole) phenol and 139 g (0.3 mole) of the mono-octadecyl ester of 1,2,4-benzene tricarboxylic acid prepared in accordance with the procedure of Preparation 1, supra.

Phosgene is introduced at the rate of 36 grams/minute and phosgenation is continued for thirty-five minutes. The pH is maintained between 6 and 8 for the first five minutes of phosgene addition and between 10 and 11 for the remaining 31 minutes by the addition of 25% aqueous sodium hydroxide. After phosgenation has been terminated 7 liters of methylene chloride are added, the brine layer is separated by centrifuge and the resin solution is washed with aqueous acid and water. The resin is then steam precipitated and dried. The polycarbonate comprises 3.0 weight percent O $(CH_2)_{17}CH_3$ of the total resin weight. The dried resin has an IV value of 0.471 and a Tg of 136.5° C. 454 g of this resin is then blended with 4086 g of standard bisphenol-A polycarbonate homopolymer of intrinsic viscosity of about 0.50 and to this resin blend is added a minor amount (about 0.03 parts by weight per hundred parts by weight of resin) of a phosphite color stabilizer.

This resin product is then fed to an extruder operating at a temperature of about 510° F. to extrude the resin into strands and extruded strands are chopped into pellets.

Portions of the pellets are injection molded into the box mold described above. Ejection of the molded article from the mold box is carried out. The averaged observed ejector pin pressure is set forth in the following Table, with the number of readings of pin pressure averaged.

EXAMPLE 5

The procedure of Example 4, supra, is repeated except that the octadecyl ester of 1,2,4-benzene tricarboxylic acid as used therein is replaced with 129.6 g (0.25 moles) of the docosanyl monoester of 1,2,4-benzene tricarboxylic acid, prepared in accordance with the procedure of Preparation 2, supra. The polycarbonate comprises O $(CH_2)_{21}CH_3$ as 3.0 percent by weight of the total resin.

The results of testing the pellets of resin blend are set forth in the Table, below.

EXAMPLE 6

This example is not an example of the invention but is made for comparative purposes.

A portion of the polycarbonate homopolymer used in Examples 4 and 5 is melt blended with 0.3 percent by weight of a conventional mold release additive (pentaerythritoltetrastearate) and extruded. Portions of the pellets are injection molded a number of times into the box mold described above. Ejection of the molding from the mold is carried out. The average observed ejector pin pressure is set forth in the Table below as a comparative example with the number of readings of pin pressure observed.

TABLE

| Resin Example | R | Weight % OR | Mole % Phenol | IV | Tg (°C.) | Average Ejector Pin Pressure (Kg/cm²) |
|---|---|---|---|---|---|---|
| 1 | None (control) | 0 | 3.7 | 0.523 | 148.7 | Molding Broke (No Release) |
| 2 | Octadecyl | 0.3 | 3.7 | 0.523 | 148.7 | 253(6)* |
| 3 | Docosanyl | 0.3 | 3.7 | 0.502 | 147.6 | 287(8) |
| 4 | 1:9 Blend (Octadecyl) | 0.3 | — | — | — | 280(5) |
| 5 | 1:9 Blend (Docosanyl) | 0.3 | — | — | — | 213(8) |
| 6 | None (Comparative with conventional mold release additive) | 0 | — | — | — | 260(15) |

*In parenthesis is the number of individual moldings for which pin pressure readings were determined and averaged.

What is claimed:

1. A thermoplastic polyester-carbonate resin containing in the polymer chain, divalent moieties of the formula:

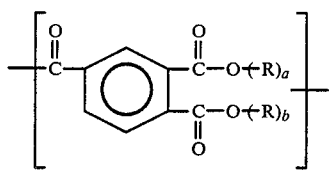

wherein R represents alkyl of from about 10 to 36 carbon atoms, inclusive; a and b are each whole number integers of from 0 to 1; and the sum of a +b is 1.

2. The resin of claim 1 wherein said —OR moiety in the formula (I) comprises from 0.001 to 10 parts by weight of the resin.

3. The resin of claim 1 wherein R contains 18 carbon atoms.

4. The resin of claim 1 wherein R contains 22 carbon atoms.

5. The resin of claim 1 which contains in the polymer chain repeating units of the formulae:

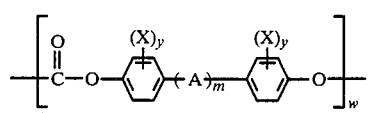

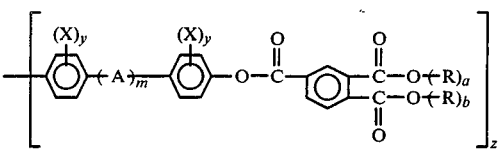

wherein R is as defined in claim 1; A is selected from the group consisting of a divalent hydrocarbon containing from 1 to about 15 carbon atoms; a substituted divalent hydrocarbon radical containing from 1 to about 15 carbon atoms and substituent groups such as halogen;

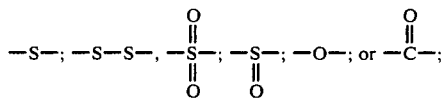

and wherein each X is independently selected from the group consisting of halogen, a monovalent hydrocarbon radical such as an alkyl group of from 1 to about 8 carbon atoms, an aryl group of from 6–18 carbon atoms, an aralkyl group of from 7 to about 14 carbon atoms, an oxyalkyl group of from 1 to about 8 carbon atoms, and an oxyaryl group of from 6 to 18 carbon atoms; and wherein m is zero or 1 and y is a whole number integer of from 0 to 4; z is an integer such that the ester moiety OR comprises 0.001 to 10 weight percent of the resin; and w is an integer such that w and z together are such that the resin has a weight average molecular weight in the range of from about 5,000 to about 200,000.

6. A thermoplastically injection moldable, synthetic resin composition, which comprises;
   a polycarbonate resin; and
   an effective amount for mold-release of a mold-release additive selected from polyester-carbonate polymers containing in the polymer chain divalent moieties of the formula:

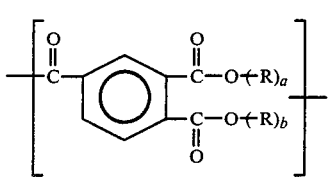

wherein R represents alkyl of from about 10 to 36 carbon atoms, inclusive, a and b are each whole number integers of from 0 to 1; and the sum of a+b is 1.

7. The composition of claim 6 wherein the effective amount is sufficient of the additive to provide in the total composition from 0.001 to 1.0 weight percent of the resin, of the moiety OR given in the formula (I).

8. The composition of claim 7 wherein R contains 18 carbon atoms.

9. The composition of claim 7 wherein R contains 22 carbon atoms.

10. The composition of claim 6 wherein the polycarbonate resin contains in the polymer chain thereof carboxylate groups of the formula:

* * * * *